United States Patent
Kim et al.

(10) Patent No.: US 10,788,918 B2
(45) Date of Patent: Sep. 29, 2020

(54) TOUCH DISPLAY DEVICE, METHOD OF DRIVING THE SAME, AND DISPLAY PANEL

(71) Applicant: LG Display Co., Ltd., Seoul (KR)

(72) Inventors: TaeHyung Kim, Paju-si (KR); HongSung Song, Goyang-si (KR); Jihye Jung, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 37 days.

(21) Appl. No.: 15/253,524

(22) Filed: Aug. 31, 2016

(65) Prior Publication Data

US 2017/0060328 A1 Mar. 2, 2017

(30) Foreign Application Priority Data

Aug. 31, 2015 (KR) .................... 10-2015-0123287

(51) Int. Cl.
*G06F 3/041* (2006.01)
*G06F 3/044* (2006.01)
*G02F 1/1333* (2006.01)

(52) U.S. Cl.
CPC ........ *G06F 3/0416* (2013.01); *G02F 1/13338* (2013.01); *G06F 3/044* (2013.01); *G06F 3/0412* (2013.01)

(58) Field of Classification Search
CPC ...... G06F 3/0416; G06F 3/0412; G06F 3/044; G02F 1/13338
USPC ....................................... 345/174
See application file for complete search history.

(56) References Cited

U.S. PATENT DOCUMENTS

| | | | | |
|---|---|---|---|---|
| 2011/0187677 A1* | 8/2011 | Hotelling | .............. | G06F 3/0412 345/174 |
| 2011/0316809 A1* | 12/2011 | Kim | ...................... | G06F 3/0412 345/174 |
| 2013/0328812 A1* | 12/2013 | Kim | ........................ | G06F 3/044 345/173 |
| 2013/0335366 A1* | 12/2013 | Lee | ......................... | G06F 3/044 345/174 |
| 2015/0338937 A1* | 11/2015 | Shepelev | ................ | G06F 3/044 345/179 |
| 2016/0188071 A1* | 6/2016 | Xu | .......................... | G06F 3/044 345/174 |

(Continued)

FOREIGN PATENT DOCUMENTS

CN 102866815 A 1/2013
CN 103838431 A 6/2014

*Primary Examiner* — Chanh D Nguyen
*Assistant Examiner* — Ngan T. Pham-Lu
(74) *Attorney, Agent, or Firm* — Seed IP Law Group LLP

(57) ABSTRACT

Disclosed is an in-cell touch type touch display device in which the number of touch lines is reduced to increase a transmittance, and the number of touch integrated circuits (ICs) is reduced to lower the manufacturing cost. The touch display device includes a touch display panel and a driving circuit unit. A plurality of touch sensors may be disposed in the touch display panel, and a plurality of subpixels including a common electrode may be provided between the plurality of touch sensors. The subpixels may be provided between the plurality of touch sensors which are adjacent to each other in a horizontal direction and a vertical direction. The driving circuit unit may include a touch driver, a touch sensing unit, and a power supply. The touch driver may supply a touch driving signal to the plurality of touch sensors.

16 Claims, 8 Drawing Sheets

(56) References Cited

U.S. PATENT DOCUMENTS

2017/0010747 A1* 1/2017 Furutani ................ G06F 3/044

* cited by examiner

FIG. 8

[86 inches ultra-HD]

| Item | Related art | Invention | | | |
|---|---|---|---|---|---|
| | | 1×1 subpixel separation | 1×2 subpixel separation | 2×1 subpixel separation | 2×2 subpixel separation |
| Number of touch sensors | 51,840 | 46,646 | 43,274 | 45,484 | 42,196 |
| Number of touch lines (one side) | 25,920 | 23,323 | 21,637 | 22,742 | 21,098 |
| Number of touch lines in each subpixel | 3ea | 3ea | 2ea | 2ea | 2ea |

Number of touch lines in each subpixel 2ea: 23,040
Number of touch lines in each subpixel 3ea: 34,560

TOUCH DISPLAY DEVICE, METHOD OF DRIVING THE SAME, AND DISPLAY PANEL

CROSS-REFERENCE TO RELATED APPLICATIONS

This application claims the benefit of the Korean Patent Application No. 10-2015-0123287 filed on Aug. 31, 2015, which is hereby incorporated by reference as if fully set forth herein.

BACKGROUND

Field of the Invention

The present invention relates to an in-cell touch type touch display device, and more particularly, to a touch display device in which the number of touch lines is reduced to increase a transmittance, and the number of touch integrated circuits (ICs) is reduced to lower the manufacturing cost.

Discussion of the Related Art

Instead of input devices such as a mouse or a keyboard which is conventionally applied as an input device for liquid crystal display (LCD) devices, a touch panel that enables a user to directly input information through a screen with a finger or a pen is being applied to display devices. Since all users can easily manipulate the touch panel, the application of the touch panel is being expanded.

Touch panels are categorized into a resistive type, a capacitance type, an infrared type, etc. depending on a touch sensing method. Recently, since the capacitance type provides convenience in a manufacturing process and is good in touch sensitivity, the capacitance type is attracting much attention. Capacitive touch panels are categorized into a mutual capacitance type and a self-capacitance type.

Recently, LCD devices to which a touch screen is applied have been developed in an in-cell touch type where a capacitive touch sensor is built into a liquid crystal panel, for slimming the LCD devices. In the following description, a touch panel denotes that the touch sensor is built into the liquid crystal panel.

FIG. 1 is a diagram schematically illustrating a related art touch display device 1. FIG. 2 is a diagram illustrating an example where one touch sensor is provided in an area corresponding to a plurality of pixels.

Referring to FIGS. 1 and 2, the related art touch display device 1 includes a touch display panel 10 and a driving circuit unit. In the driving circuit unit of FIG. 1, a source/touch driver 30 and a gate driver 50 are illustrated, and a timing controller and a touch sensing unit are not illustrated.

The source/touch driver 30 includes a plurality of source/touch driving integrated circuits (ICs) 35. A half of the plurality of source/touch driving ICs 35 are disposed on an upper end of the touch display panel 10, and the other half are disposed on a lower end of the touch display panel 10. A plurality of touch sensors 20 are disposed in the touch display panel 10, and each of the touch sensors 20 is connected to a corresponding source/touch driving IC 35 through a touch line 40.

As illustrated in FIG. 2, one touch sensor 20 may be disposed to correspond to a plurality of pixels. For example, each of the touch sensors 20 may be disposed in an area which corresponds to twenty-four pixels in a horizontal direction and twenty pixels in a vertical direction. In this case, each of the touch sensors 20 is configured by a common electrode which is disposed for displaying an image. That is, the plurality of touch sensors 20 are configured by patterning the common electrode.

One frame period is divided into a display period and a touch period, and a display operation and a touch sensing operation are time-divisionally performed. In the display period, a data voltage is supplied to a pixel electrode, and a common voltage (Vcom) is supplied to the plurality of touch sensors 20, thereby displaying an image. In the touch period, the source/touch driver 30 supplies a touch driving signal to each of the touch sensors 20, and the touch sensing unit receives a capacitance charged into each of the touch sensors 20, and detects a variation of the capacitance of each of the touch sensors 20 to determine whether there is a touch and detect a touch position.

In large-screen (for example, 86 inches or more) touch display devices that display an image at a resolution of 4K ultra high definition (UHD) or more, the number of the touch sensors 20 increases in proportion to a screen size, and for this reason, the number of the touch lines 40 increases. For example, in 86 inches touch display devices, if each of the touch sensors 20 is configured as illustrated in FIG. 2, a total of 51,840 touch sensors 20 are provided, and a plurality of touch lines 40 equal to the number of the touch sensors 20 are provided. If the number of the touch lines 40 increases, the number of contacts which respectively connect the touch lines 40 to the touch sensors 20 increases identically.

Therefore, as the number of the touch lines 40 increases, a transmittance of the touch display panel 10 is reduced, causing the degradation in display quality. Also, the number of input and output channels of the touch/touch driving ICs 35 increases by the number of the touch lines 40, and for this reason, a more number of source/touch driving ICs 35 are needed, causing the increase in manufacturing cost.

Moreover, by using all conventional common electrodes as the touch sensors 20, the common voltage (Vcom) is not fed back, and for this reason, display quality is degraded by a variation of the common voltage.

SUMMARY

Accordingly, the present invention is directed to provide an in-cell touch type touch display device and a method of driving the same that reduce one or more problems due to limitations and disadvantages of the related art.

The inventors have recognized the above-described problems and propose the following technical solutions.

An aspect of the present invention is directed to provide an in-cell touch type touch display device in which the number of touch lines is reduced.

Another aspect of the present invention is directed to provide an in-cell touch type touch display device with enhanced transmittance.

Another aspect of the present invention is directed to provide an in-cell touch type touch display device in which the number of input and output channels of a source/touch driving IC is reduced, thereby decreasing a size of a source/touch driver.

Another aspect of the present invention is directed to provide an in-cell touch type touch display device in which the number of input and output channels of a source/touch driving IC is reduced, thereby decreasing the manufacturing cost.

Another aspect of the present invention is directed to provide an in-cell touch type touch display device that feeds back a common voltage to prevent display quality from being degraded by a variation of the common voltage.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch display device including a touch display panel and a driving circuit unit. A plurality of touch sensors may be disposed in the touch display panel, and a plurality of subpixels including a common electrode may be provided between the plurality of touch sensors. The subpixels may be provided between the plurality of touch sensors which are adjacent to each other in a horizontal direction and a vertical direction. The driving circuit unit may include a touch driver, a touch sensing unit, and a power supply. The touch driver may supply a touch driving signal to the plurality of touch sensors. The touch sensing unit may detect a variation of a capacitance received from each of the plurality of touch sensors. Also, the power supply may supply the common voltage to the plurality of touch sensors and the common electrode.

In the touch display device according to embodiments of the present invention, one or more subpixels may be provided between touch sensors which are adjacent to each other in the horizontal direction.

In the touch display device according to embodiments of the present invention, one or more subpixels may be provided between touch sensors which are adjacent to each other in the vertical direction.

In the touch display device according to embodiments of the present invention, a first common electrode may be disposed between touch sensors which are adjacent to each other in the horizontal direction, a second common electrode may be disposed between touch sensors which are adjacent to each other in the vertical direction, and the first common electrode and the second common electrode may be connected to each other.

In the touch display device according to embodiments of the present invention, the common voltage generated by the power supply may be supplied to the plurality of touch sensors and the common electrode via the touch driver.

The touch display device according to embodiments of the present invention may further include a feedback line that is connected to the common electrode to feed back the common voltage to the power supply.

In the touch display device according to embodiments of the present invention, the feedback line may be disposed in the same direction as that of the gate line.

In the touch display device according to embodiments of the present invention, the common voltage may be fed back to the power supply via the touch driver.

In another aspect of the present invention, there is provided a display panel including a plurality of subpixels having a first-direction length and a second-direction length. Also, the display panel may include a first touch sensor and a second touch sensor. The first touch sensor may have a size wider than an area corresponding to two or more of the plurality of subpixels and may be disposed to overlap the two or more subpixels. Also, the second touch sensor may be provided in plurality, and the plurality of second touch sensors may be spaced apart from the first touch sensor by the first-direction length or more of each of the plurality of subpixels.

The display panel according to an embodiment of the present invention may further include a third touch sensor spaced apart from the first touch sensor by the second-direction length or more of each of the plurality of subpixels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 8 is a diagram showing an effect where the number of touch lines and the number of touch sensors are reduced according to embodiments of the present invention.

DETAILED DESCRIPTION OF THE INVENTION

Figure 1:
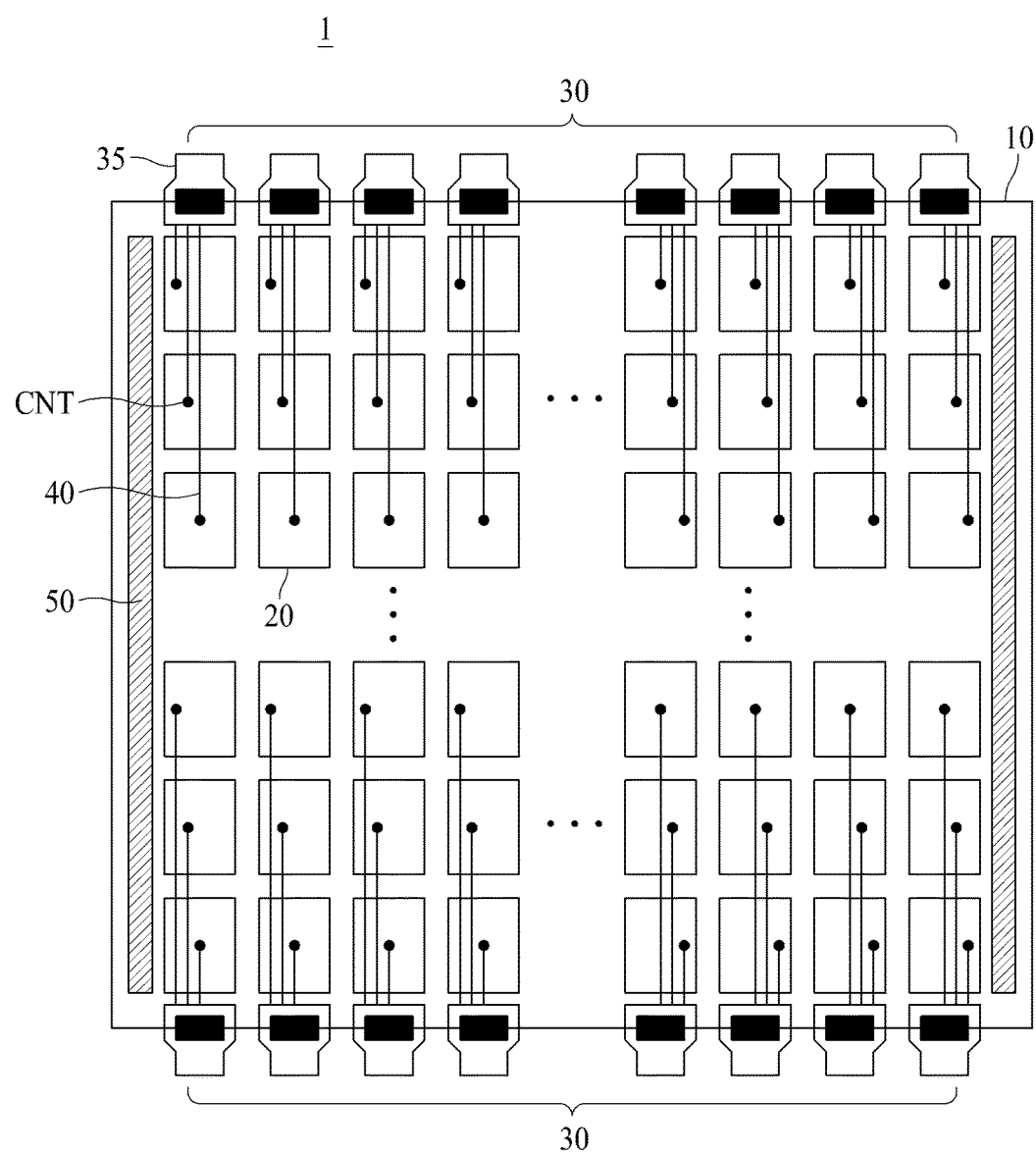
FIG. 1 is a diagram schematically illustrating a related art touch display device 1.
Figure 2:
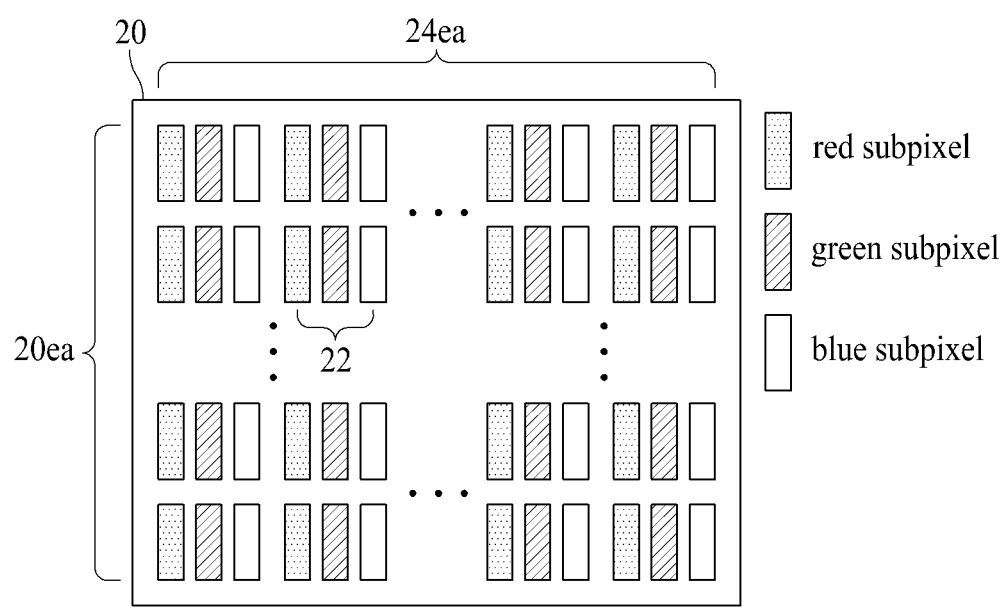
FIG. 2 is a diagram illustrating an example where one touch sensor is provided in an area corresponding to a plurality of pixels.

Reference will now be made in detail to the exemplary embodiments of the present invention, examples of which are illustrated in the accompanying drawings. Wherever possible, the same reference numbers will be used throughout the drawings to refer to the same or like parts.

In the specification, it should be noted that like reference numerals already used to denote like elements in other drawings are used for elements wherever possible. In the following description, when a function and a configuration known to those skilled in the art are irrelevant to the essential configuration of the present invention, their detailed descriptions will be omitted. The terms described in the specification should be understood as follows.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Furthermore, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~' a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

An X axis direction, a Y axis direction, and a Z axis direction should not be construed as only a geometric relationship where a relationship therebetween is vertical, and may denote having a broader directionality within a scope where elements of the present invention operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter embodiments of the present invention will be described in detail with reference to the accompanying drawings.

LCD devices have been variously developed in a twisted nematic (TN) mode, a vertical alignment (VA) mode, an in-plane switching (IPS) mode, and a fringe field switching (FFS) mode depending on to a method of adjusting the alignment of liquid crystal.

Among the modes, the TN mode and the VA mode are modes in which a pixel electrode is disposed on a lower substrate, and a common electrode is disposed on an upper substrate (a color filter array substrate), thereby adjusting the alignment of liquid crystal with a vertical electric field.

The IPS mode and the FFS mode are modes in which a pixel electrode and a common electrode are disposed on a lower substrate, and the alignment of liquid crystal is adjusted with an electric field between the pixel electrode and the common electrode.

The IPS mode is a mode in which a plurality of pixel electrodes and a plurality of common electrodes are alternately arranged in parallel, and thus, a lateral electric field is generated between a pixel electrode and a common electrode adjacent to each other, thereby adjusting the alignment of liquid crystal. The FFS mode is a mode in which a pixel electrode and a common electrode are provided in plurality to be spaced apart from each other with an insulating layer therebetween. In this case, one electrodes of the pixel electrodes and common electrodes are formed in a plate shape or a pattern, and the other electrodes are formed in a finger shape. The FFS mode is a mode that adjusts the alignment of liquid crystal with fringe fields generated between the pixel electrodes and common electrodes.

A mode of a touch panel according to an embodiment of the present invention is not limited, and a vertical alignment mode (the TN mode and the VA mode) and an in-plane switching mode (the IPS mode and the FFS mode) may be applied to the touch panel according to an embodiment of the present invention. In this disclosure below, the IPS mode or the FFS mode may be applied to the touch panel according to an embodiment of the present invention for example.

Hereinafter, a touch display device and a method of driving the same according to embodiments of the present invention will be described based on an example where a plurality of touch sensors are arranged in a touch panel, and touch sensing is performed in a self-capacitance type. However, the present invention is not limited thereto, and the touch display device and the method of driving the same according to embodiments of the present invention may also be based on another example where a plurality of touch driving electrodes and a plurality of touch sensing electrodes are arranged in a touch panel, and touch sensing is performed in a mutual capacitance type.

Hereinafter, a touch display device and a method of driving the same according to embodiments of the present invention will be described in detail with reference to the accompanying drawings.

Figure 3:
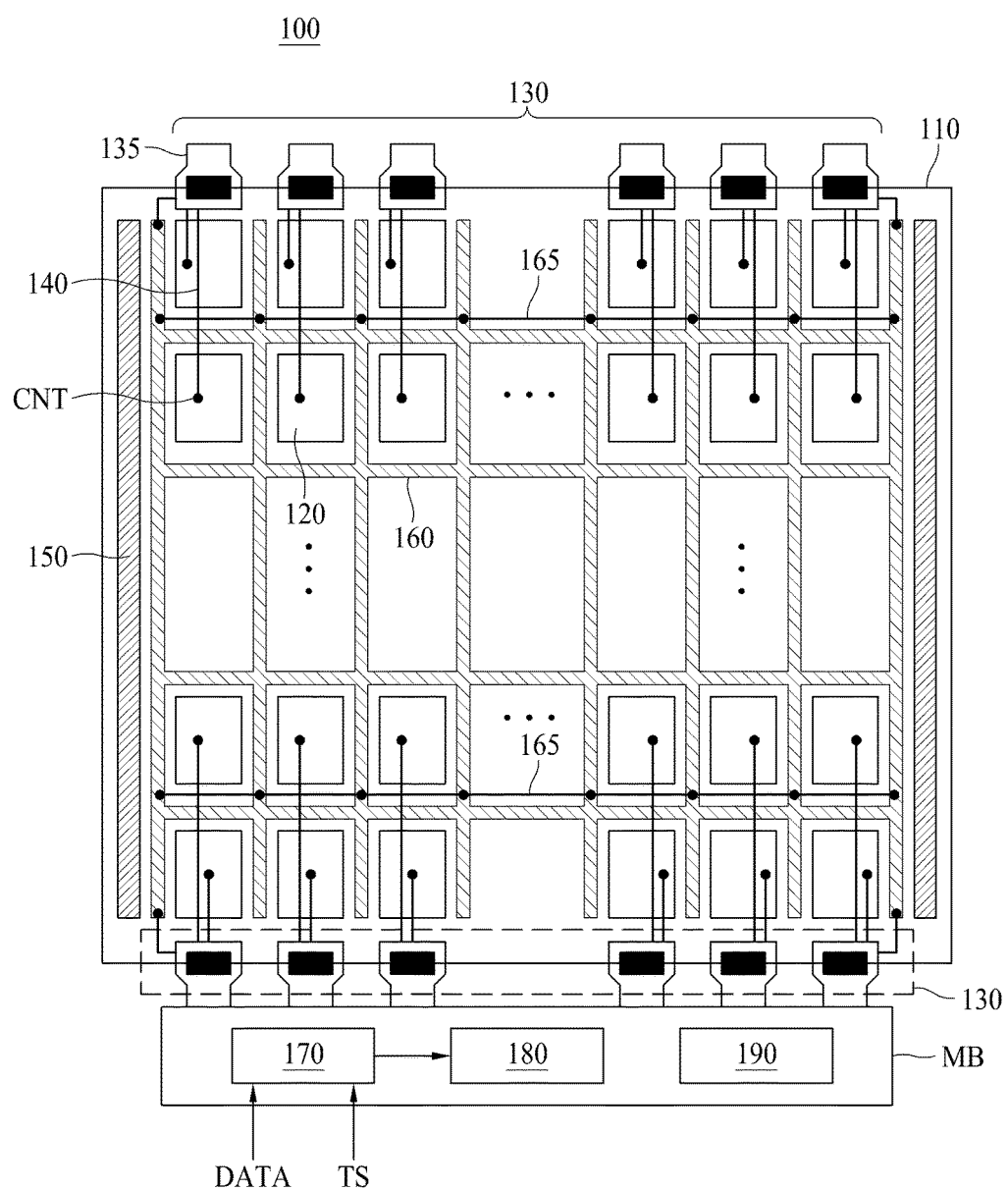
FIG. 3 illustrates a touch display device according to an embodiment of the present invention and is a diagram illustrating an example where a gate driver is disposed in a non-display area of a liquid crystal panel in a gate-in panel (GIP) type.

FIG. 3 illustrates a touch display device 100 according to an embodiment of the present invention and is a diagram illustrating an example where a gate driver is disposed in a non-display area of a liquid crystal panel in a gate-in panel (GIP) type.

Referring to FIG. 3 the touch display device 100 according to an embodiment of the present invention may include a touch display panel 110 and a driving circuit unit. A plurality of touch sensors 120 may be disposed in the touch display panel 110. A common electrode 160 may be disposed between the touch sensors 120.

The plurality of touch sensors 120 may be spaced apart from each other with at least one subpixel therebetween, and the common electrode 160 may be provided in a subpixel disposed between the touch sensors 120. The common electrode 160 disposed between the touch sensors 120 may be electrically connected in a whole area of the touch display panel 110, and in a display period, a common voltage (Vcom) generated by a common voltage generator of a power supply 190 may be supplied to the common electrode 160.

The touch display panel 110 may include a liquid crystal panel and the plurality of touch sensors 120 coupled to the liquid crystal panel, and light should be supplied to the touch display panel 110 so as to display an image. To this end, the touch display device 100 according to an embodiment of the present invention may include a backlight unit.

The touch display device 100 according to an embodiment of the present invention may distinguish the display period and a touch period to display an image and sense a touch. For example, the touch display device 100 may divide one frame period into the display period and the touch period to time-divisionally perform a display operation and a touch sensing operation.

In the display period, a data voltage may be supplied to a pixel electrode, and the common voltage (Vcom) may be supplied to the plurality of touch sensors 120 and the common electrode 160, thereby displaying an image. In the touch period, a touch driving signal may be supplied to each of the touch sensors 120, and then, a variation of a capacitance charged into each of the touch sensors 120 may be detected, thereby determining whether there is a touch and detecting a touch position.

The touch display panel 110 may include a thin film transistor (TFT) array substrate, a color filter array substrate, and a liquid crystal layer disposed therebetween.

A plurality of RGB color filters may be disposed on the color filter array substrate to respectively correspond to a plurality of subpixels. Also, a black matrix that defines an opening area of each of the subpixels and prevents colors from being mixed with each other may be disposed on the color filter array substrate.

The plurality of subpixels may be arranged in a matrix type on the TFT array substrate and may be defined by a plurality of data lines and a plurality of gate lines which intersect each other. A red subpixel, a green subpixel, and a blue subpixel may configure one pixel. Each of the subpixels may include a TFT which is a switching element, a pixel electrode, a common electrode, and a storage capacitor.

In the present embodiment, each of the touch sensors 120 may be used as an electrode for displaying an image, in addition to an electrode for sensing a touch. To this end, the plurality of touch sensors 120 and the common electrode 160 may be formed by patterning a conductive transparent electrode in units of a plurality of subpixels, and the common electrode 160 may be disposed between the touch sensors 120. The pixel electrode, the common electrode 160, and the touch sensors 120 may each include a transparent conductive material such as indium tin oxide (ITO) and/or the like.

Here, the pixel electrode may be provided in each of the subpixels, and the touch sensor 120 and the common electrode 160 may be provided in units of a plurality of subpixels. In the display period, subpixels where the touch sensors 120 are provided may be supplied with the common voltage to display an image. In the display period, subpixels where the common electrode is provided may receive the common voltage supplied to the common electrode 160 to display an image.

The driving circuit unit may include a source/touch driver 130 including a plurality of source/touch driving ICs 135, a gate driver 150, a timing controller 170, a touch sensing unit 180, and the power supply 190. All element or some elements of the driving circuit unit may be disposed in the touch display panel 110 in a chip-on glass (COG) type or a chip-on film (COF, chip-on flexible printed circuit) type.

The gate driver 150 may be internalized into the TFT array substrate of the touch display panel 110 in an amorphous silicon gate (ASG) type or a gate-in panel (GIP) type, but is not limited thereto. In other embodiments, the gate driver including a plurality of gate driving ICs may be disposed on one side or both sides of the liquid crystal panel.

The timing controller 170 may convert input RGB image signals into frame-unit digital RGB image data by using a timing signal TS input from the outside and may supply the RGB image data to the source/touch driver 130. In this case, the timing signal TS may include a vertical synchronization signal V-sync, a horizontal synchronization signal H-sync, a clock signal CLK, etc.

Moreover, the timing controller 170 may generate a gate control signal GCS for controlling the gate driver 150 by using the timing signal TS to supply the gate control signal GCS to the gate driver 150. The gate control signal GCS may include a gate start pulse GSP, a gate shift clock GSC, a gate output enable signal GOE, etc.

Moreover, the timing controller 170 may generate a data control signal DCS for controlling the source/touch driver 130 by using the timing signal TS and may supply the data control signal DCS to the source/touch driver 130. The data control signal DCS may include a source start pulse SSP, a source sampling clock SSC, a source output enable signal SOE, a polarity control signal POL, etc.

Moreover, the timing controller 170 may supply a synchronization signal for the display period and the touch period to the touch sensing unit 180, in order for the touch sensing unit 180 to be driven in the touch period. That is, the touch sensing unit 180 may distinguish the display period and the touch period, based on the synchronization signal supplied from the timing controller 170.

The touch sensing unit 180 may receive a capacitance charged into each of the touch sensors 120. Subsequently, the touch sensing unit 180 may detect a variation of the capacitance of each of the touch sensors 120 to determine whether there is a touch and detect a touch position.

The gate driver 150 may generate a switch enable signal according to a control signal SCS supplied from the timing controller 170 during one frame period, and in the touch period of the one frame period, the gate driver 150 may supply the switch enable signal to a plurality of touch switches included in each of the plurality of touch sensors 120.

Moreover, in the display period of one frame period, the gate driver 150 may sequentially supply a gate driving signal to a plurality of gate lines GL arranged in the touch display panel 110. The TFT included in each subpixel may be turned on by the gate driving signal.

The source/touch driver 130 may convert digital RGB image data, supplied from the timing controller 170, into analog image signals (i.e., RGB data voltages). Also, the source/touch driver 130 may respectively supply the data voltages to the plurality of data lines DL at a time when the TFT of each subpixel is turned on, based on the data control signal DCS. The data voltages may be respectively supplied to the plurality of subpixels, and the common voltage Vcom may be supplied to the plurality of touch sensors 120, thereby displaying an image. In this case, the common voltage may be generated by the power supply 190 and may be supplied to the plurality of touch sensors 120 and the common electrode 160.

A feedback line 165 which is connected to the common electrode 160 to feed back the common voltage may be provided in the touch display panel 110. The common electrode 160 may be connected to the feedback line 165 through a contact, and the feedback line 165 may be connected to the source/touch driving IC 135. Here, the feedback line 165 may be disposed in the same direction as that of the gate line GL and may be formed simultaneously in a process of forming the gate line GL.

The source/touch driving IC 135 may feed back the common voltage input thereto to the power supply 190, and the power supply 190 may check a variation of the common voltage, based on the fed back common voltage.

When the common voltage has varied, the power supply 190 may compensate for the common voltage by a varied voltage value, and in the display period, the power supply 190 may supply the compensated common voltage to the touch sensors 120 and the common electrode 160. Therefore, an in-cell touch type touch display device may also feed back the common voltage, thereby preventing image quality from being degraded by a variation of the common voltage. That is, the display quality of the in-cell touch type touch display device is enhanced.

Figure 4:
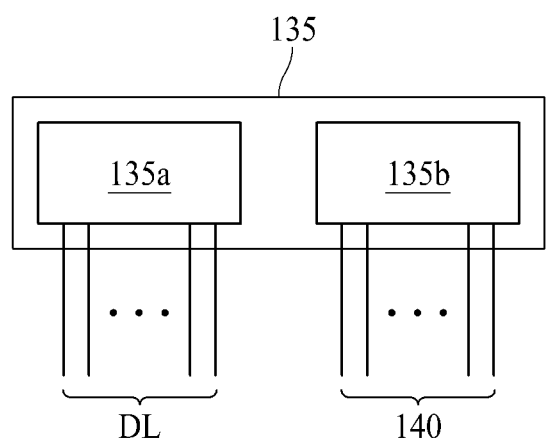
FIG. 4 is a diagram illustrating one of a plurality of source/touch driving ICs included in a source/touch driver according to an embodiment of the present invention.

FIG. 4 is a diagram illustrating one of a plurality of source/touch driving ICs included in a source/touch driver according to an embodiment of the present invention.

Referring to FIGS. 3 and 4, the source/touch driving IC 135 may include a data driver 135*a* and a touch driver 135*b*. In FIG. 4, the source/touch driving IC 135 is illustrated as including one data driver 135*a* and one touch driver 135*b*, but is not limited thereto. In other embodiments, the source/touch driving IC 135 may include one data driver 135*a* and a plurality of touch drivers 135*b*.

The data line DL disposed in each subpixel may be connected to the data driver 135*a*, and an image signal (a pixel electrode voltage) may be supplied to each subpixel through the data line DL.

The plurality of touch sensors 120 arranged in the touch display panel 110 may be connected to the source/touch driving IC 135 through a plurality of touch lines 140. Here, one touch sensor 120 may be connected to the source/touch driving IC 135 through at least one touch line 140.

Here, the touch lines 140 may be arranged in the same direction as the data lines DL. The touch lines 140 may be disposed on the same layer as the data lines DL. However, the present embodiment is not limited thereto, and the touch lines 140 may be disposed on a layer different from a layer on which the data lines DL are disposed.

If the touch lines 140 and the data lines DL are disposed on different layers, the touch lines 140 and the data lines DL may be arranged to overlap each other. In this case, the touch lines 140 may be arranged over the data lines DL.

Figure 5:
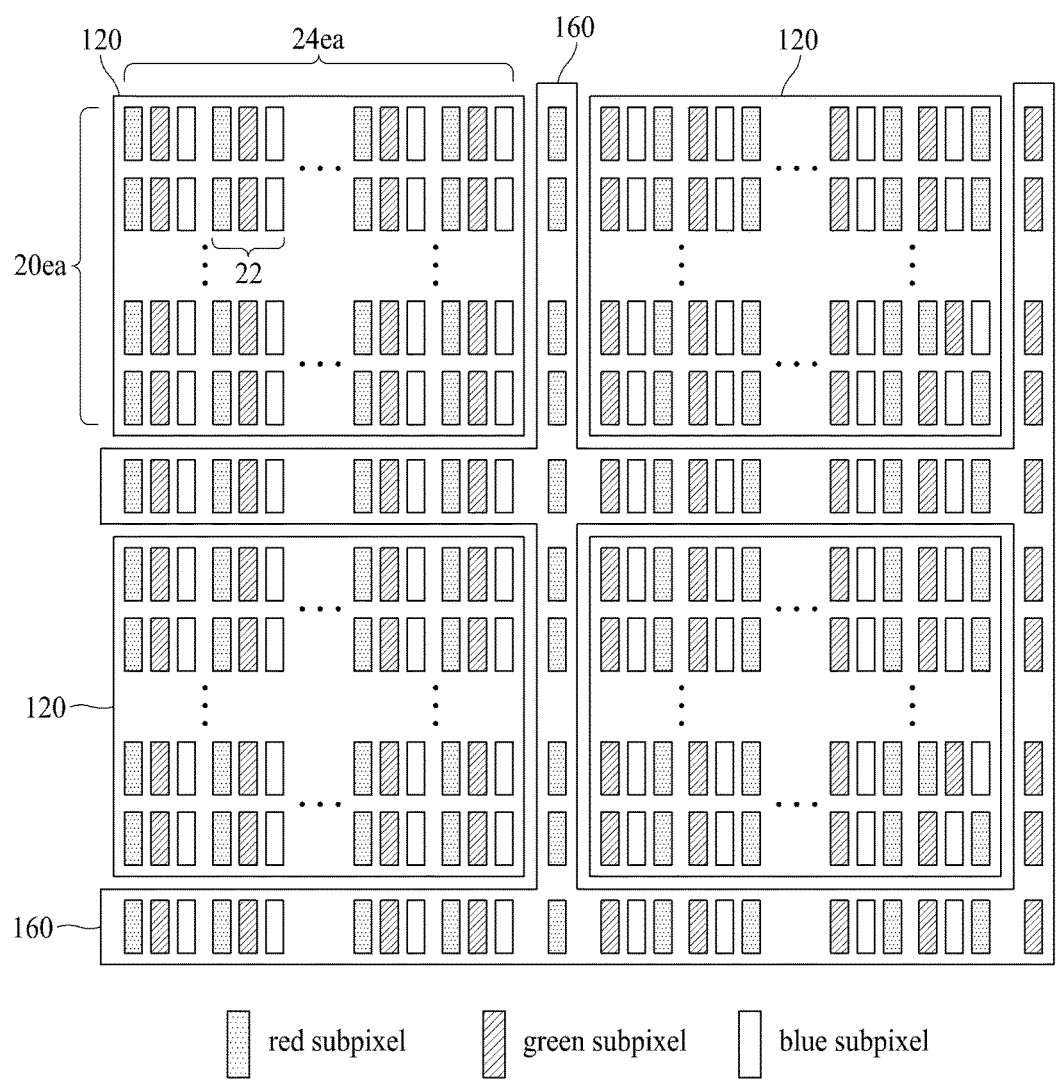
FIG. 5 is a diagram illustrating an example where one touch sensor is provided in an area corresponding to a plurality of pixels.
Figure 6:
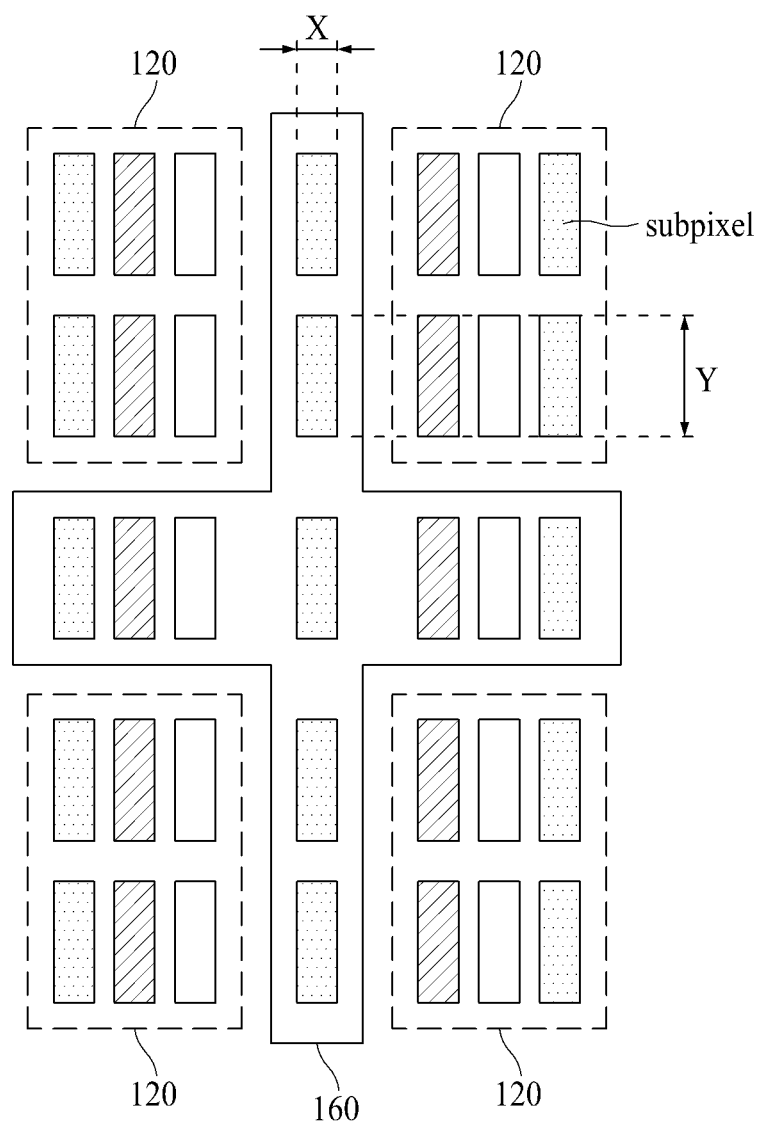
FIG. 6 is a diagram illustrating an example where touch sensors are spaced apart from each other with subpixels therebetween.

FIG. 5 is a diagram illustrating an example where one touch sensor is provided in an area corresponding to a plurality of pixels. FIG. 6 is a diagram illustrating an example where touch sensors are spaced apart from each other with subpixels therebetween.

Referring to FIGS. 5 and 6, the plurality of touch sensors 120 may each be provided in an area corresponding to a plurality of pixels. For example, each of the plurality of touch sensors 120 may be disposed in an area which corresponds to twenty pixels in a vertical direction and twenty-four pixels in a horizontal direction. That is, one touch sensor 120 may be disposed in an area corresponding to 480 pixels. However, the present embodiment is not limited thereto, and a size of each of the touch sensors 120 may be modified based on a size of the touch display panel 110 and desired touch performance. The plurality of touch sensors 120 may not be disposed in the same size, and for example, second touch sensors disposed an outer portion (edges of four surfaces) of the touch display panel 110 may be smaller in size than first touch sensors disposed in a middle portion of the touch display panel 110.

At least one subpixel may be disposed between the plurality of touch sensors 120, and the common electrode 160 may be provided in a subpixel disposed between the plurality of touch sensors 120.

Here, one subpixel or a plurality of subpixels (for example, two subpixels) may be provided between touch sensors which are adjacent to each other in a horizontal direction. That is, a plurality of touch sensors which are adjacent to each other in the horizontal direction may be disposed with one or two subpixels therebetween and may be spaced apart from each other.

In the touch period, a touch driving signal may not be supplied to subpixels provided between touch sensors which are adjacent to each other in a horizontal direction, and thus, each of the subpixels cannot act as a touch electrode. However, in the display period, the common voltage may be supplied to the plurality of touch sensors 120 and the common electrode 160 of each of subpixels provided between touch sensors which are adjacent to each other in the horizontal direction, thereby displaying an image.

Furthermore, one subpixel or a plurality of subpixels (for example, two subpixels) may be provided between touch sensors which are adjacent to each other in a vertical direction. That is, a plurality of touch sensors which are adjacent to each other in the vertical direction may be disposed with one or two subpixels therebetween and may be spaced apart from each other.

In the touch period, the touch driving signal may not be supplied to subpixels provided between touch sensors which are adjacent to each other in the vertical direction, and thus, each of the subpixels cannot act as a touch electrode. However, in the display period, the common voltage may be supplied to the plurality of touch sensors 120 and the common electrode 160 of each of subpixels provided between touch sensors which are adjacent to each other in the vertical direction, thereby displaying an image.

As illustrated in FIG. 6, a horizontal width "X" of each subpixel may have a first length, and a vertical width "Y" of each subpixel may have a second length.

Therefore, since at least one subpixel is provided between adjacent touch sensors 120, a plurality of touch sensors 120 arranged in a horizontal direction may be spaced apart from each other by the first length or more. Also, a plurality of touch sensors 120 arranged in a vertical direction may be spaced apart from each other by the second length or more. In this manner, the number of touch sensors 120 arranged in the horizontal direction decreases by a horizontal width of each of subpixels provided between adjacent touch sensors 120. Also, the number of touch sensors 120 arranged in the vertical direction decreases by a vertical width of each of subpixels provided between adjacent touch sensors 120. As described above, the number of touch lines 140 decreases by the reduced number of the touch sensors 120, and an interval between adjacent touch lines 140 increases, thereby increasing a transmittance of the touch display device.

Figure 7:
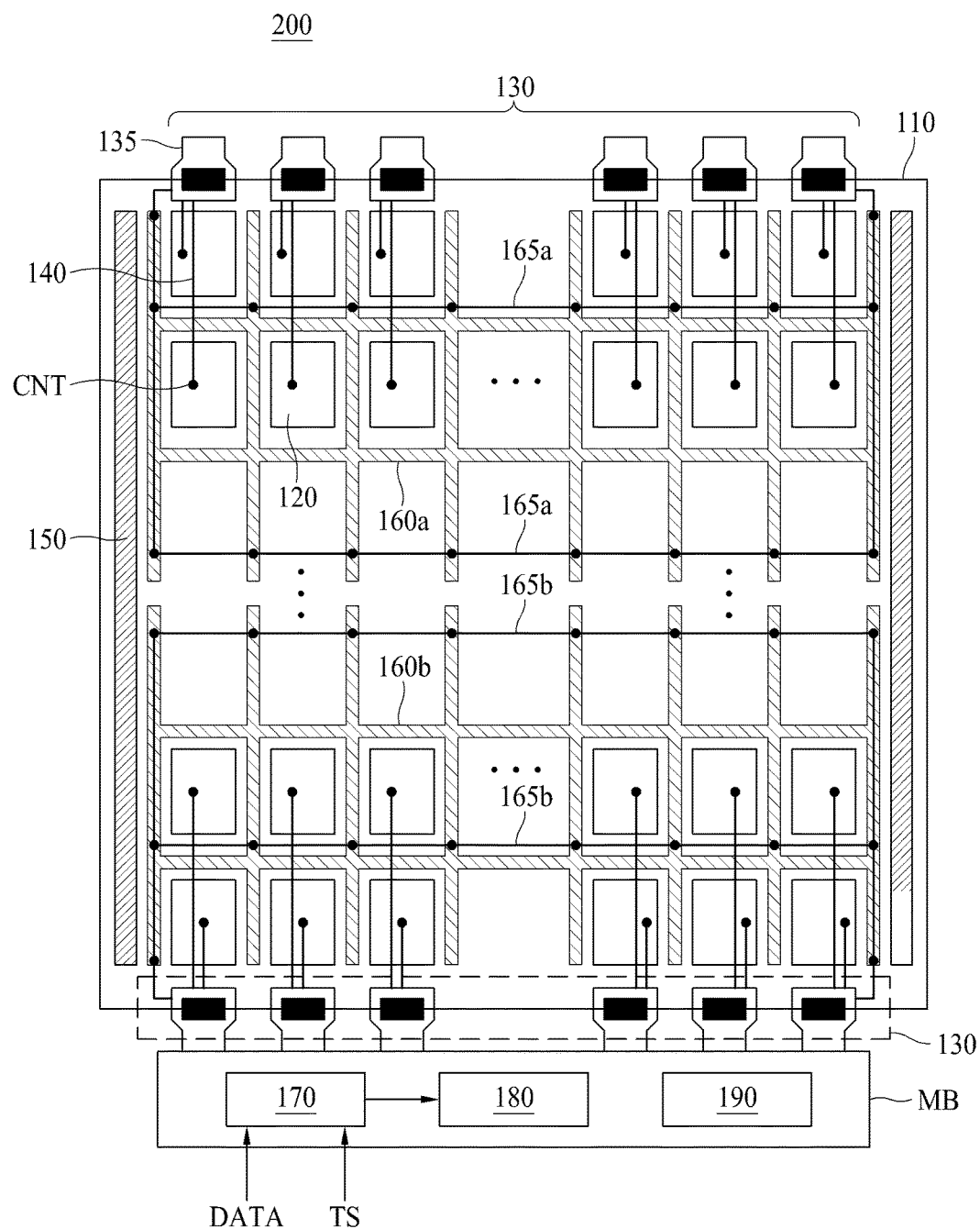
FIG. 7 illustrates a touch display device according to another embodiment of the present invention and is a diagram illustrating an example where a gate driver is disposed in a non-display area of a liquid crystal panel in a GIP type.

FIG. 7 illustrates a touch display device 200 according to another embodiment of the present invention and is a diagram illustrating an example where a gate driver is disposed in a non-display area of a liquid crystal panel in a GIP type.

Referring to FIG. 7, except that a plurality of common electrodes 160a and 160b are respectively disposed on an upper end and a lower end of a liquid crystal panel 110 and a feedback line includes an upper feedback line 165a and a lower feedback line 165b, the touch display device 200 according to another embodiment of the present invention may be the same as the above-described embodiment.

A first common electrode 160a may be disposed on the upper end of the liquid crystal panel 110, and a second common electrode 160b may be disposed on the lower end of the liquid crystal panel 110. Also, a common voltage may be divisionally supplied to the first common electrode 160a and the second common electrode 160b.

Here, the first common electrode 160a disposed on the upper end of the liquid crystal panel 110 may be connected to a plurality of upper feedback lines 165a through a contact. Also, the second common electrode 160b disposed on the lower end of the liquid crystal panel 110 may be connected to a plurality of lower feedback lines 165b through a contact. The plurality of upper feedback lines 165a may be electrically connected to each other. Also, the plurality of lower feedback lines 165b may be electrically connected to each other. The upper feedback lines 165a may be connected to a source/touch driving IC 135 disposed on an upper side of the liquid crystal panel 110. Also, the lower feedback lines 165b may be connected to a source/touch driving IC 135 disposed on a lower side of the liquid crystal panel 110.

As described above, a common electrode may be divisionally disposed on the upper end and the lower end of the liquid crystal panel 110, the first common electrode 160a may be connected the upper feedback line 165a, and the second common electrode 160b may be connected the lower feedback line 165b, thereby reducing the voltage drop of the common voltage.

FIG. 8 is a diagram showing an effect where the number of touch lines and the number of touch sensors are reduced according to embodiments of the present invention.

Referring to FIG. 8, the number of touch sensors decreases by the number of one or two subpixels disposed between touch sensors which are adjacent to each other in a horizontal direction. Also, the number of touch lines decreases in proportion to the reduced number of touch sensors. Also, a transmittance of each of a plurality of subpixels increases by the reduced number of touch lines, thereby enhancing display quality. Also, the number of channels of the source/touch driving IC decreases by the reduced number of touch sensors, and thus, the number of source/touch driving ICs is reduced, thereby reducing the manufacturing cost.

Moreover, the number of touch sensors decreases by the number of one or two subpixels disposed between touch sensors which are adjacent to each other in a vertical direction. Also, the number of touch lines decreases in proportion to the reduced number of touch sensors. Also, a transmittance of each subpixel increases by the reduced number of touch lines, thereby enhancing display quality. Also, the number of channels of the source/touch driving IC decreases by the reduced number of touch sensors, and thus, the number of source/touch driving ICs is reduced, thereby reducing the manufacturing cost.

In detail, various examples where the number of touch sensors and the number of touch lines are reduced in a touch display device having an 86 inches screen size and a 4K resolution will be described below.

For example, one subpixel may be provided between touch sensors which are adjacent to each other in the vertical direction, and one subpixel may be provided between touch sensors which are adjacent to each other in the horizontal direction. Therefore, if a plurality of touch sensors are provided and spaced apart from each other, the total number of touch sensors is reduced by 46,646. Also, the number of touch lines is reduced by 23,323.

As another example, one subpixel may be provided between touch sensors which are adjacent to each other in the vertical direction, and two subpixels may be provided between touch sensors which are adjacent to each other in the horizontal direction. Therefore, if a plurality of touch sensors are provided and spaced apart from each other, the total number of touch sensors is reduced by 43,274. Also, the number of touch lines is reduced by 21,637.

As another example, two subpixels may be provided between touch sensors which are adjacent to each other in the vertical direction, and one subpixel may be provided between touch sensors which are adjacent to each other in the horizontal direction. Therefore, if a plurality of touch sensors are provided and spaced apart from each other, the total number of touch sensors is reduced by 45,484. Also, the number of touch lines is reduced by 22,742.

As another example, two subpixels may be provided between touch sensors which are adjacent to each other in the vertical direction, and two subpixels may be provided between touch sensors which are adjacent to each other in the horizontal direction. Therefore, if a plurality of touch sensors are provided and spaced apart from each other, the total number of touch sensors is reduced by 42,196. Also, the number of touch lines is reduced by 21,098.

As described above, the number of channels of the source/touch driving IC 135 decreases by the reduced number of touch sensors, and thus, the number of source/touch driving ICs is reduced. Also, a transmittance of each subpixel increases in proportion to the reduced number of touch lines, thereby enhancing display quality.

The essential elements and functions of the touch display device 100 according to the embodiments of the present invention will be summarized below.

The touch display device 100 according to the embodiments of the present invention may include the touch display panel 110 and the driving circuit unit. The plurality of touch sensors 120 may be disposed in the touch display panel 110, and a plurality of subpixels including the common electrode 160 may be provided between the plurality of touch sensors 120. The subpixels may be provided between the plurality of touch sensors 120 and may separate touch sensors 120 which are adjacent to each other in the horizontal direction and the vertical direction. The driving circuit unit may include the source/touch driver 130, the touch sensing unit 180, and the power supply 190. The source/touch driver 130 may respectively supply image signals to the plurality of subpixels and may supply the touch driving signal to the plurality of touch sensors 120. The touch sensing unit 180 may detect a variation of a capacitance received from each of the plurality of touch sensors 120. Also, the power supply 190 may supply the common voltage to the plurality of touch sensors 120 and the common electrode 160.

In the touch display device 100 according to the embodiments of the present invention, one or more subpixels may be provided between touch sensors 120 which are adjacent to each other in the horizontal direction.

In the touch display device 100 according to the embodiments of the present invention, one or more subpixels may be provided between touch sensors 120 which are adjacent to each other in the vertical direction.

In the touch display device 100 according to the embodiments of the present invention, the first common electrode 160 may be disposed between touch sensors 120 which are adjacent to each other in the horizontal direction, the second common electrode 160 may be disposed between touch sensors 120 which are adjacent to each other in the vertical direction, and the first common electrode 160 and the second common electrode 160 may be connected to each other.

In the touch display device 100 according to the embodiments of the present invention, the common voltage generated by the power supply 190 may be supplied to the plurality of touch sensors 120 and the common electrode 160 via the source/touch driver 130.

The touch display device 100 according to the embodiments of the present invention may further include the feedback line that is connected to the common electrode 160 to feed back the common voltage to the power supply 190.

In the touch display device 100 according to the embodiments of the present invention, the feedback line may be disposed in the same direction as that of the gate line.

In the touch display device 100 according to the embodiments of the present invention, the common voltage may be fed back to the power supply 190 via the source/touch driver 130.

In a detailed embodiment of the present invention, a display panel according to an embodiment of the present invention may include a plurality of subpixels having a first-direction length and a second-direction length. Also, the display panel may include a first touch sensor and a second touch sensor. The first touch sensor may have a size wider than an area corresponding to two or more of the plurality of subpixels and may be disposed to overlap the two or more subpixels. Also, the second touch sensor may be provided in plurality, and the plurality of second touch sensors may be spaced apart from the first touch sensor by the first-direction length or more of each of the plurality of subpixels.

The display panel according to an embodiment of the present invention may further include a third touch sensor spaced apart from the first touch sensor by the second-direction length or more of each of the plurality of subpixels.

Moreover, one or more subpixels may be provided between the first touch sensor and the second touch sensor. Also, a common electrode may be provided in the one or more subpixels provided between the first touch sensor and the second touch sensor.

Moreover, one or more subpixels may be provided between the first touch sensor and the third touch sensor. Also, a common electrode may be provided in the one or more subpixels provided between the first touch sensor and the third touch sensor.

In the in-cell touch type touch display device according to the embodiments of the present invention, the number of touch lines is reduced, thereby enhancing transmittance. Also, the number of input and output channels of the source/touch driving IC is reduced, thereby decreasing a size of the source/touch driver. Also, the number of input and output channels of the source/touch driving IC is reduced, thereby decreasing the manufacturing cost. Also, the in-cell touch type touch display device may feed back the common voltage to prevent display quality from being degraded by a variation of the common voltage.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch display device comprising:
a plurality of touch sensors;
a plurality of subpixels provided as an array along a horizontal direction and a vertical direction, each of the plurality of subpixels having a subpixel length in the vertical direction and a subpixel width in the horizontal direction;
a common electrode overlapping the plurality of subpixels;
a touch driver supplying a touch driving signal to the plurality of touch sensors;
a touch sensing unit detecting a variation of a capacitance received from each of the plurality of touch sensors; and
a power supply supplying a common voltage to the plurality of touch sensors and the common electrode,
wherein the common electrode includes:
a plurality of first common electrodes extending in the horizontal direction; and
a plurality of second common electrodes extending in the vertical direction, the plurality of first common electrodes and the plurality of second common electrodes intersecting each other and connected to each other,
wherein the touch sensors are spaced apart from one another in the horizontal direction by the second common electrodes, and the touch sensors are spaced apart from one another in the vertical direction by the first common electrodes,
wherein the plurality of touch sensors, the first common electrodes, and the second common electrodes are coupled to the power supply supplying the common voltage during a display period for displaying an image and the plurality of touch sensors are coupled to the touch driver that supplies the touch driving signal only to the plurality of touch sensors during a touch period for determining presence and position of touch,
wherein each of the touch sensors has a first length in the vertical direction and a first width in the horizontal direction, wherein the first length of the touch sensors is greater than a length in the vertical direction of the first common electrodes, and the first width of the touch sensors is greater than a width in the horizontal direction of the second common electrodes, and
wherein the length in the vertical direction of the first common electrodes is greater than the subpixel length and less than twice the subpixel length, and the width in the horizontal direction of the second common electrodes is greater than the subpixel width and less than twice the subpixel width.

2. The touch display device of claim 1, wherein one or more subpixels are provided between touch sensors which are adjacent to each other in the horizontal direction.

3. The touch display device of claim 1, wherein one or more subpixels are provided between touch sensors which are adjacent to each other in the vertical direction.

4. The touch display device of claim 1, wherein the first common electrode is connected to the second common electrode.

5. The touch display device of claim 1, wherein the power supply supplies the common voltage to the plurality of touch sensors and the common electrode via the touch driver.

6. The touch display device of claim 1, further comprising: a feedback line connected to the common electrode to feed back the common voltage to the power supply.

7. The touch display device of claim 6, wherein the common voltage is fed back from the common electrode to the power supply via the feedback line and the touch driver.

8. The touch display device of claim 1, wherein the touch sensors do not overlap the first common electrodes or the second common electrodes.

9. A display panel comprising:
a plurality of subpixels arranged along a horizontal direction and a vertical direction, each of the plurality of subpixels having a subpixel width in the horizontal direction and a subpixel length in the vertical direction;
a first touch sensor having a size wider than an area corresponding to a first plurality of subpixels including two or more subpixels among the plurality of subpixels, the first touch sensor being disposed to overlap the first plurality of subpixels;
a second touch sensor spaced apart from the first touch sensor by the subpixel width or more of the subpixel;
a third touch sensor spaced apart from the first touch sensor by the subpixel length or more of the subpixel;
a second plurality of subpixels positioned between the first and second touch sensors and provided as an array along the vertical direction;
a third plurality of subpixels positioned between the first and third touch sensors and provided as an array along the horizontal direction;
a first common electrode between the first touch sensor and the second touch sensor, the first common electrode extending in the vertical direction and overlapping the second plurality of subpixels;
a second common electrode between the first touch sensor and the third touch sensor, the second common electrode extending in the horizontal direction and overlapping the third plurality of subpixels, wherein the first common second electrode and the second common electrode intersect each other and connected to each other; and
a power supply that provides a common voltage to the first and second common electrodes and to the first, second, and third touch sensors in a display time period,
wherein the first touch sensor is spaced apart from the second touch sensor in the horizontal direction by the first common electrode, and the first touch sensor is spaced apart from the third touch sensor in the vertical direction by the second common electrode,
wherein each of a touch sensor of the first, second, and third touch sensors has a first width in the horizontal direction and a first length in the vertical direction, wherein the first width of the first and second touch sensors are greater than a width in the horizontal direction of the first common electrodes and the first length of the first and third touch sensors are greater than a length in the vertical direction of the second common electrodes.

10. The display panel of claim 9, wherein one or more subpixels are provided between the first touch sensor and the second touch sensor.

11. The display panel of claim 10, wherein the first common electrode is provided in the one or more subpixels provided between the first touch sensor and the second touch sensor.

12. The display panel of claim 9, wherein one or more subpixels are provided between the first touch sensor and the third touch sensor.

13. The display panel of claim 12, wherein the second common electrode is provided in the one or more subpixels provided between the first touch sensor and the third touch sensor.

14. The display panel of claim 9, wherein the first, second, and third touch sensors do not overlap with the first common electrodes or the second common electrodes.

15. A touch display device comprising:
a plurality of touch sensors including a first touch sensor and a second touch sensor;
a plurality of pixels arranged along a horizontal direction and a vertical direction being transverse to the horizontal direction, each of the pixels including one or more subpixels, the subpixels having a subpixel width in the horizontal direction and a subpixel length in the vertical direction;
a plurality of first common electrodes in the horizontal direction, the first common electrodes overlapping the subpixels along the horizontal direction by a dimension greater than the subpixel length and less than twice the subpixel length;
a plurality of second common electrodes in the vertical direction, the second common electrodes overlapping the subpixels along the vertical direction by a dimension greater than the subpixel width and less than twice the subpixel width, the plurality of first common electrodes and the plurality of second common electrodes intersecting each other and connected to each other;
a first touch line connected to the first touch sensor;
a second touch line connected to the second touch sensor;
a touch driver supplying a touch driving signal to the first touch sensor through the first touch line and the second touch sensor through the second touch line during a touch period;
a touch sensing unit detecting a variation of a capacitance received from the first touch sensor and the second touch sensor during the touch period; and
a power supply supplying a common voltage to the first touch sensor, the second touch sensor, and the common electrode during a display period,
wherein the plurality of touch sensors are spaced apart from one another in the horizontal direction by the plurality of the second common electrodes, and the plurality of touch sensors are spaced apart from one another in the vertical direction by the plurality of the first common electrodes,
wherein the plurality of touch sensors, the plurality of first common electrodes and the plurality of second common electrodes are coupled to the power supply supplying the common voltage during a display period for displaying an image and the plurality of touch sensors are coupled to the touch driver that supplies the touch driving signal to the plurality of touch sensors during a touch period for determining presence and position of touch,
wherein each of the first and second touch sensor has a first width in the horizontal direction and a first length in the vertical direction, wherein the first width of the touch sensors is greater than a width in the horizontal direction of the second common electrodes and the first length of the touch sensor is greater than a width in the vertical direction of the first common electrodes.

16. The touch display device of claim 15, further comprising:
a plurality of first subpixels; and
a plurality of second subpixels, wherein the first and second touch sensors overlap with the plurality of first subpixels and the first and second common electrodes overlap with the plurality of second subpixels, wherein the plurality of first subpixels and the plurality of second subpixels do not overlap with each other.

* * * * *